(12) United States Patent
Duesterhoeft

(10) Patent No.: US 7,625,238 B2
(45) Date of Patent: Dec. 1, 2009

(54) LOW PROFILE PHOTOVOLTAIC EDGE CONNECTOR

(75) Inventor: Scott S. Duesterhoeft, Etters, PA (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 11/930,331

(22) Filed: Oct. 31, 2007

(65) Prior Publication Data

US 2009/0142945 A1 Jun. 4, 2009

(51) Int. Cl.
*H01R 13/66* (2006.01)
(52) U.S. Cl. .................................. 439/620.22
(58) Field of Classification Search ............ 439/80, 439/620.22, 620.21, 357, 281–282
See application file for complete search history.

(56) References Cited

U.S. PATENT DOCUMENTS

| | | | | |
|---|---|---|---|---|
| 4,990,099 | A * | 2/1991 | Marin et al. | 439/284 |
| 7,077,676 | B2 * | 7/2006 | Matsumoto et al. | 439/271 |
| 7,097,516 | B2 * | 8/2006 | Werner et al. | 439/709 |
| 7,387,537 | B1 * | 6/2008 | Daily et al. | 439/620.22 |
| 7,445,508 | B2 * | 11/2008 | Daily et al. | 439/620.22 |
| 2001/0050102 | A1 | 12/2001 | Matsumi et al. | |

FOREIGN PATENT DOCUMENTS

| | | |
|---|---|---|
| DE | 10 2005 022 226 | 11/2006 |
| EP | 1 717 866 | 11/2006 |
| JP | 2003 158285 | 5/2003 |

OTHER PUBLICATIONS

PCT International Search Report; International Application No. PCT/US2008/012163; International Filing Date Oct. 27, 2008.

* cited by examiner

*Primary Examiner*—Jean F Duverne

(57) ABSTRACT

The connection system includes input and output modules that are edge-mounted on a photovoltaic array to conduct the photon energy created from the arrays. The system circuitry includes a diode, heat sink and connector plugs for transmitting the energy from the array. A channel on the connector fits onto the edge of the photovoltaic array to accommodate small space constraints. A predetermined number of arrays may be connected in series with the connection system.

20 Claims, 14 Drawing Sheets

LOW PROFILE PHOTOVOLTAIC EDGE CONNECTOR

FIELD OF THE INVENTION

The present invention is directed to an electrical connector, and more specifically to a low-profile edge connector for connecting photovoltaic solar panels.

BACKGROUND

Photovoltaic (PV) modules or arrays produce electricity from solar energy. Electrical power produced by PV modules reduces the amount of energy required from non-renewable resources such as fossil fuels and nuclear energy. Significant environmental benefits are also realized from solar energy production, for example, reduction in air pollution from burning fossil fuels, reduction in water and land use from power generation plants, and reduction in the storage of waste byproducts. Solar energy produces no noise, and has few moving components. Because of their reliability, PV modules also reduce the cost of residential and commercial power to consumers.

PV cells are essentially large-area semiconductor diodes. Due to the photovoltaic effect, the energy of photons is converted into electrical power within a PV cell when the PV cell is irradiated by a light source such as sunlight. PV cells are typically interconnected into solar modules that have power ranges of up to 100 watts or greater. For large PV systems special PV modules are produced with typical power range of up to several 100 W. A photovoltaic module is the basic element of a photovoltaic power generation system. A PV module has many solar cells interconnected in series or parallel, according to the desired voltage and current parameters. PV cells are connected and placed between a polyvinyl plate on the bottom and a tempered glass on the top. PV cells are interconnected with thin contacts on the upper side of the semiconductor material. The typical crystalline modules power ranges from several W to up to 200 W/module.

In the case of facade or roof systems the photovoltaic system may be installed during construction, or added to the building after it is built. Roof systems are generally lower powered systems, e.g., 10 kW, to meet typical residential loads. Roof integrated photovoltaic systems may consist of different module types, such as crystalline and micro-perforated amorphous modules. Roof-integrated photovoltaic systems are integrated into the roof; such that the entire roof or a portion thereof is covered with photovoltaic modules, or they are added to the roof later. PV cells may be integrated with roof tiles or shingles.

PV modules/arrays require specially designed devices adapted for interconnecting the various PV modules/arrays with each other, and with electrical power distribution systems. PV connection systems are used to accommodate serial and parallel connection of PV arrays. In addition to connection boxes, a PV connection system includes connectors that allow for speedy field installation or high-speed manufacture of made-to-length cable assemblies. Connection or connection boxes may be required to receive specialized cable terminations from PV modules/arrays, with power diodes inside for controlling current flow to the load. PV arrays may be required in areas with tight space restraints and requirements, requiring the size of the PV module to be minimized.

What is needed is an edge connector for a photovoltaic solar array panel that satisfies one or more of these space constraint needs or provides other advantageous features. Other features and advantages will be made apparent from the present specification. The teachings disclosed extend to those embodiments that fall within the scope of the claims, regardless of whether they accomplish one or more of the aforementioned needs.

SUMMARY

One embodiment relates to an electrical connector for interconnecting adjacent photovoltaic arrays along an edge having an input module and an output module. The input module housing has at least one diode to support a predetermined voltage and current, at least one heat sink in thermal communication with the diode to dissipate heat, at least one electrically conductive connection point and at least one channel configured to receive the edge of a first photovoltaic array. A base portion houses the at least one diode, heat sink, connection point, and channel. The output module is configured to connect with the input module and has at least one connection point being electrically conductive, a channel to receive the edge of a second photovoltaic array and a base portion that houses the connection point and channel. The connector also has an electrically conductive cable connecting the input module and output module. The input module and the output module are secured to the edge of adjacent photovoltaic arrays and are in electrical communication with each other through the cable. The connection point conducts photon energy from the array to the connector.

Another embodiment relates to an electrical connector for interconnecting adjacent photovoltaic arrays along an edge having an input module and an output module. The input module housing has a cover portion, at least one diode to support a predetermined voltage and current, at least one heat sink in thermal communication with the diode to dissipate heat, at least one electrically conductive connection point and at least one channel to receive the edge of a first photovoltaic array. A base portion houses the at least one diode, heat sink, a connection point, and channel. The cover portion and the base portion are secured with a fastener. The output module connects with the input module and has at least one electrically conductive connection point, a channel for receiving the edge of a second photovoltaic array and a base portion for housing the connection point and channel. The connector also has an electrically conductive cable connecting the input module and output module. The input module and output module are secured to the edge of photovoltaic arrays and are in electrical communication with each other through the cable. The connection point conducts photon energy from the array to the connector.

One advantage of the present invention is the unique edge placement location of the connector on the array.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

The application will become more fully understood from the following detailed description, taken in conjunction with the accompanying figures, wherein like reference numerals refer to like elements, in which.

DETAILED DESCRIPTION OF THE INVENTION

Figure 1:
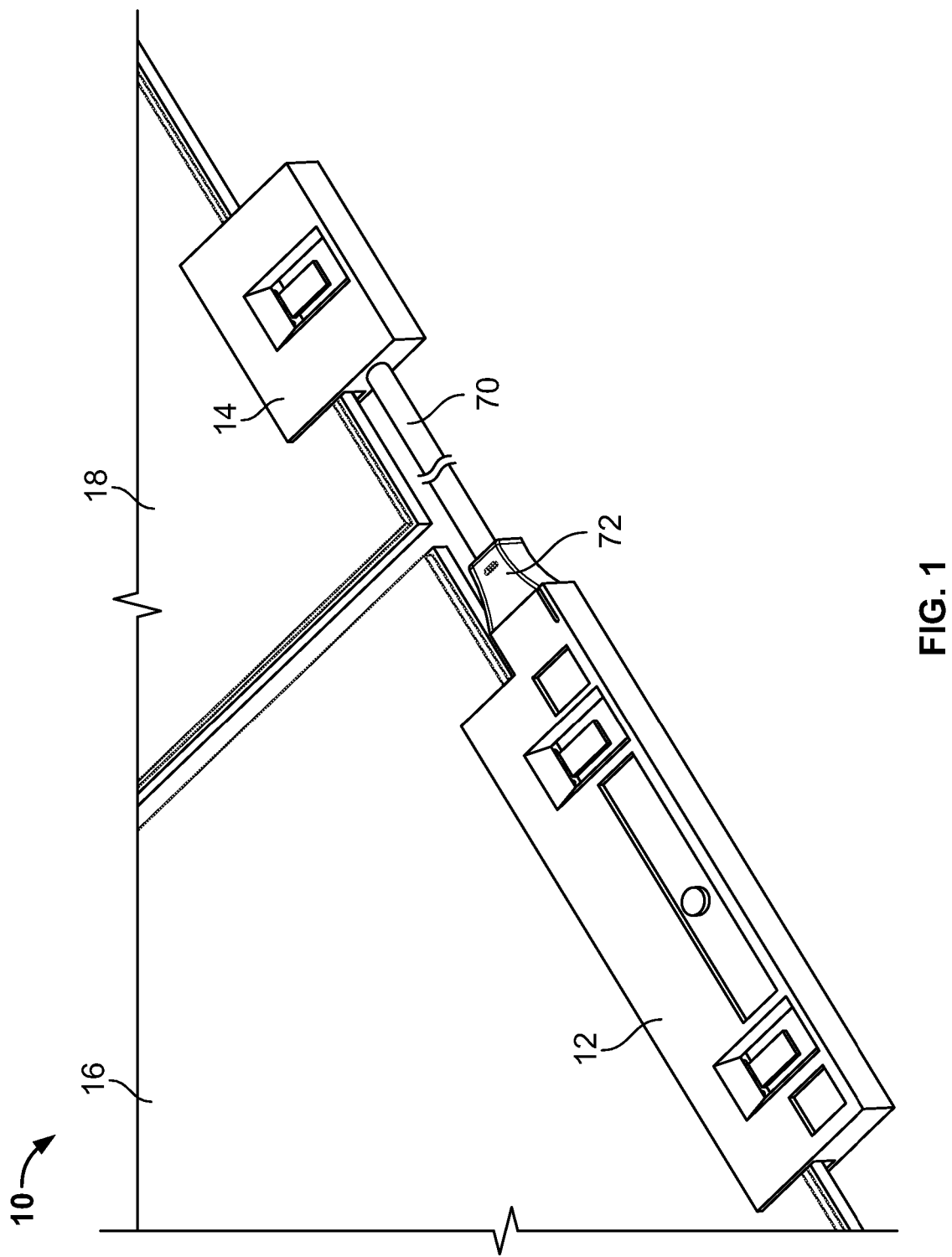
FIG. 1 is an embodiment of the present invention.

The present invention is directed to a PV box that connects to the edge of the PV array. FIG. 1 shows an embodiment of the edge connector 10, which includes an output plug 12 and an input module 14. The output plug 12 and input module 14 interconnect with a cable 70 and plug 72 connection. In a PV system, the arrays 16, 18 are disposed side by side, where an output plug 12 is secured to the first array 16. The input module 14 is secured to the next adjacent array 18. Each array 16, 18 has one output plug 12, one input module 14, and a cable 70 and plug connection 72 attached.

Figure 2:
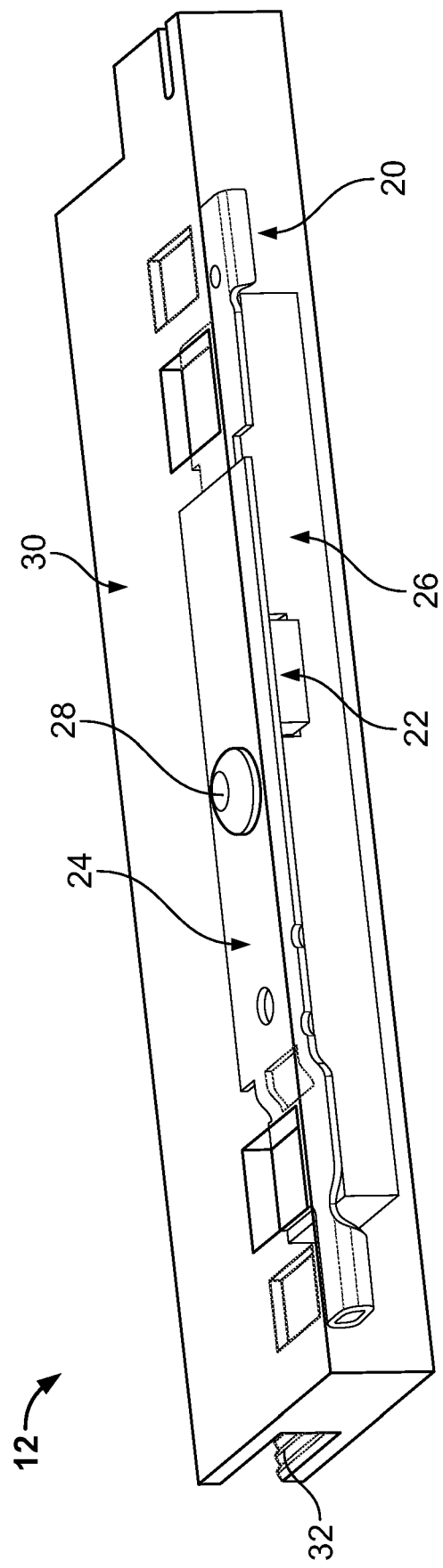
FIG. 2 is an internal view of the components in the input module of the present invention.

FIG. 2 illustrates the components of the edge connector 10. In the output plug 12, a blade 20 is used to mate with the conductive foil (not shown) of the array and conduct the photon energy from the array to the edge connector 10. A diode 22 (See e.g. FIG. 15) is connected to the power circuit to ensure proper conduction of the energy, and a heat sink 24 (See e.g. FIG. 15) is disposed on the diode 22 to act as an electrical contact and heat dissipater. While any suitable diode may be used, a TO-220 Schottky diode may be used with this embodiment, and while any suitable heat sink may be used, a copper iron sink may be used with this embodiment. A component shuttle 26 is used to manage the components 20, 22, 24 of the edge connector 10 during manufacture and maintain proper placement of the components 20, 22, 24 in the connector. In addition to the shuttle 26, a rivet 28 is used to secure the heat sink 24 to the diode. In alternative to the rivet 28, a solder or resistance weld connection may be used (not shown), such as an ultra sonic weld connection. The housing 30 is overmolded on the components and has a 'U' shaped channel 48 to accommodate the array. The array plates 16,18 fit securely and snugly into the channel 48 of the edge connector 10. In one embodiment, Room Temperature Vulcanization (RTV) silicon is used as the epoxy to maintain a secure and waterproof hold of the connector 10 on the array 16,18. However, as a person of ordinary skill in the art will appreciate, other types of epoxy may be used for securing the connector 10 to the arrays 16,18.

Figure 3:
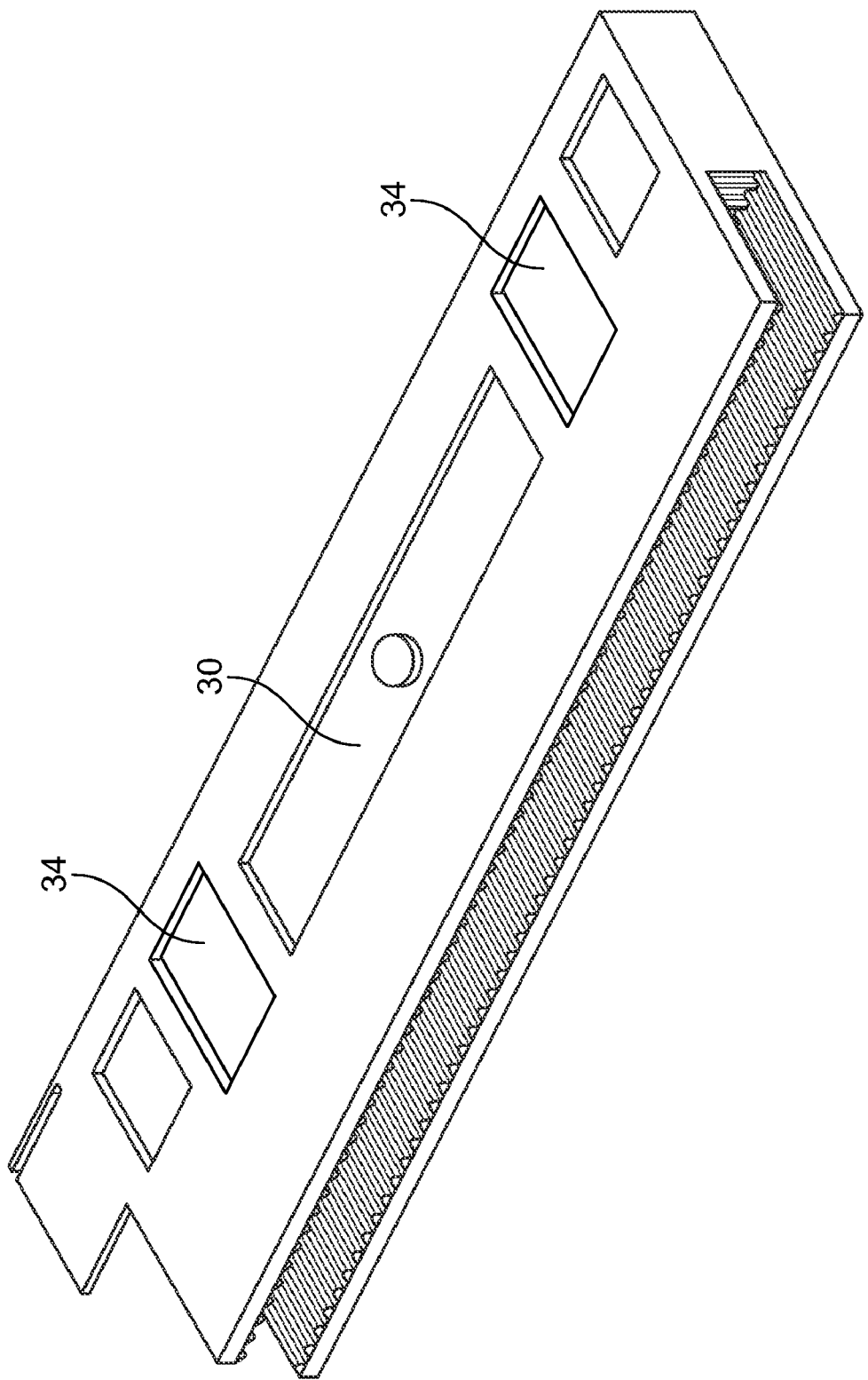
FIG. 3 is a top view of the input module present invention.

Referring to FIG. 3, apertures 34 are located on the top surface of the housing 30 to provide receptacles for a soldering connection with the array foils. Once the conductive connection to the array 16,18 is made, these apertures 34 are sealed and filled in with silicon or other suitable sealing and protective material.

Figure 4:
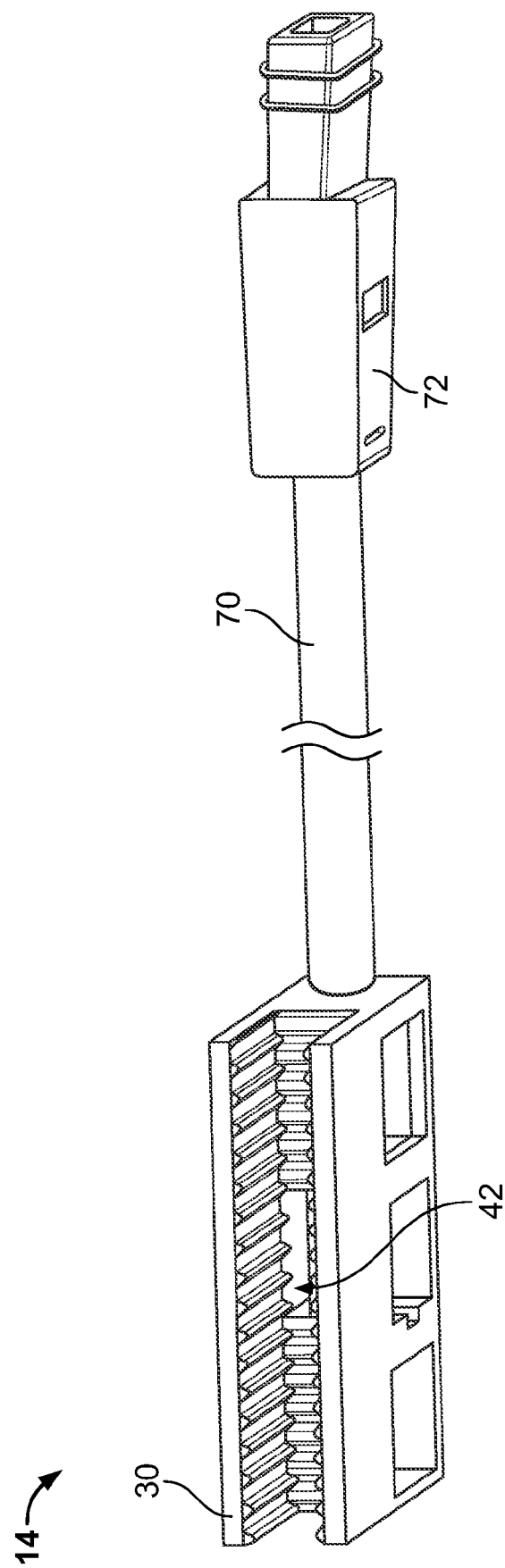
FIG. 4 is the output module of the present invention.
Figure 5:
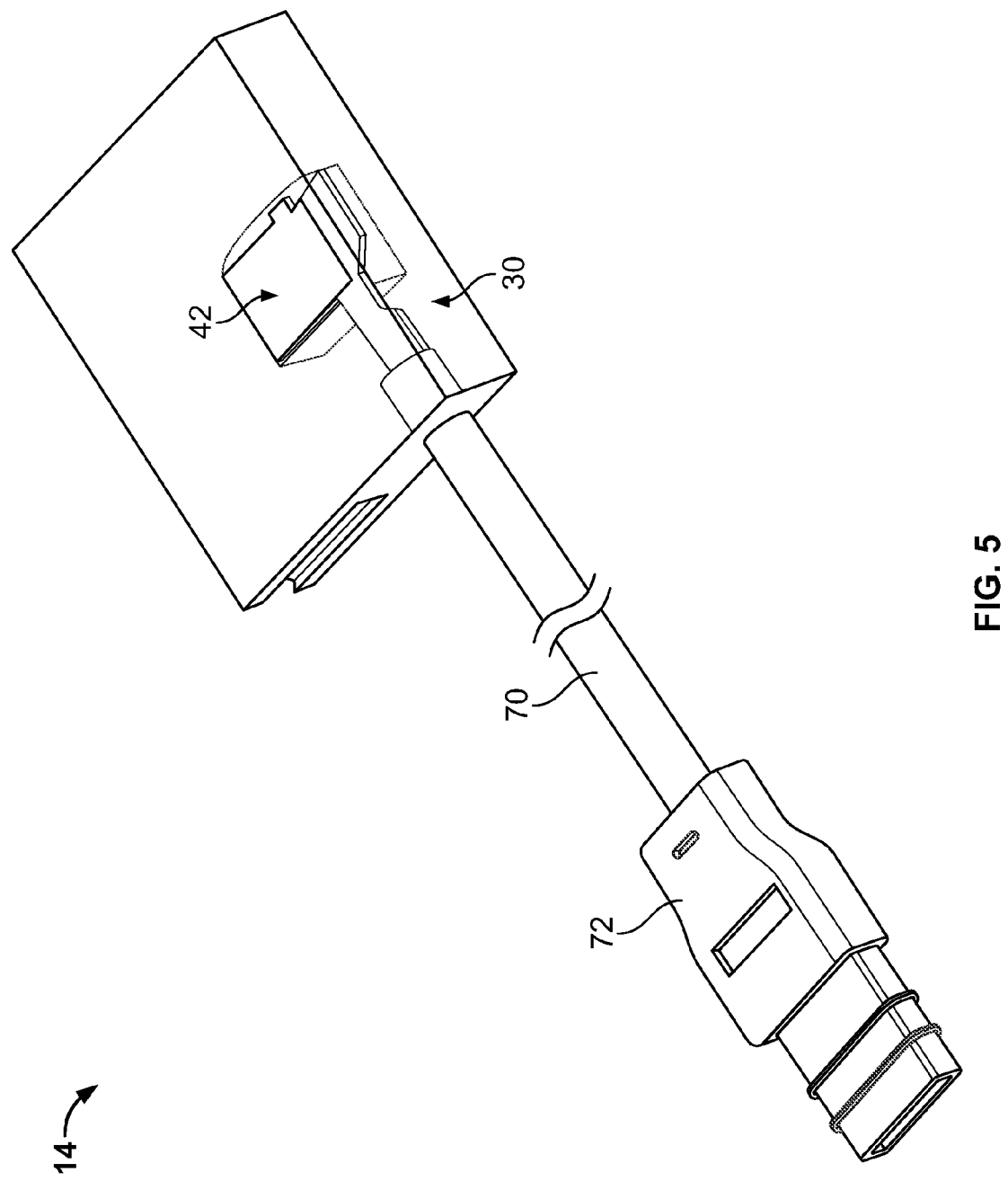
FIG. 5 is an internal view of the output module of the present invention.
Figure 6:
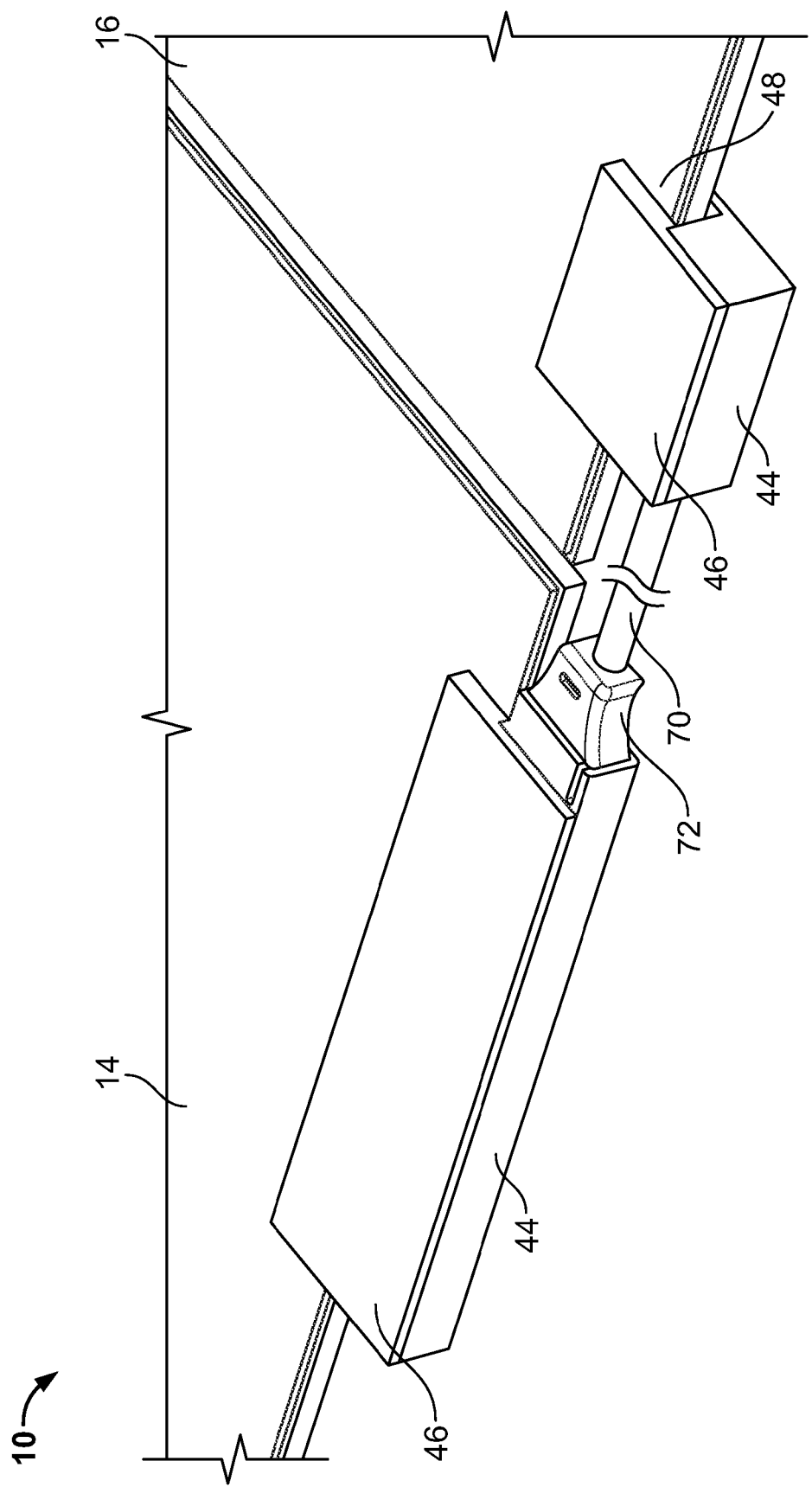
FIG. 6 is an embodiment of the present invention.

FIGS. 4 and 5 show the input module 14 of the edge connector. A crimp connection is disposed on the inside of the module 14. The housing 40 has a foil access window 42, which permits a conductive connection to be made from the array (not shown in FIGS. 4 and 5) to the module 14. The window 42 is filled in or covered for protection.

Figure 7:
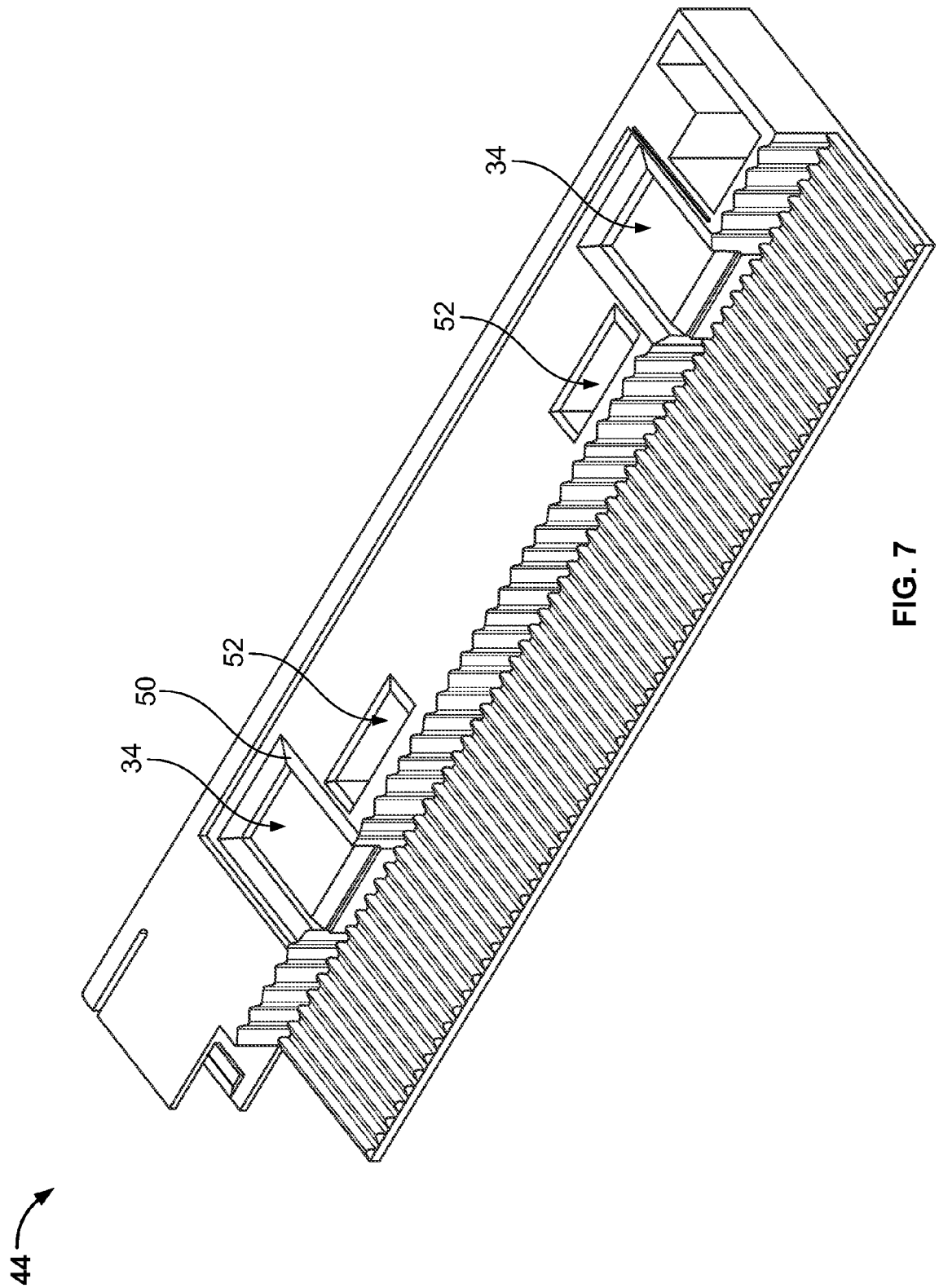
FIG. 7 is a top view of the present invention without covers.
Figure 8:
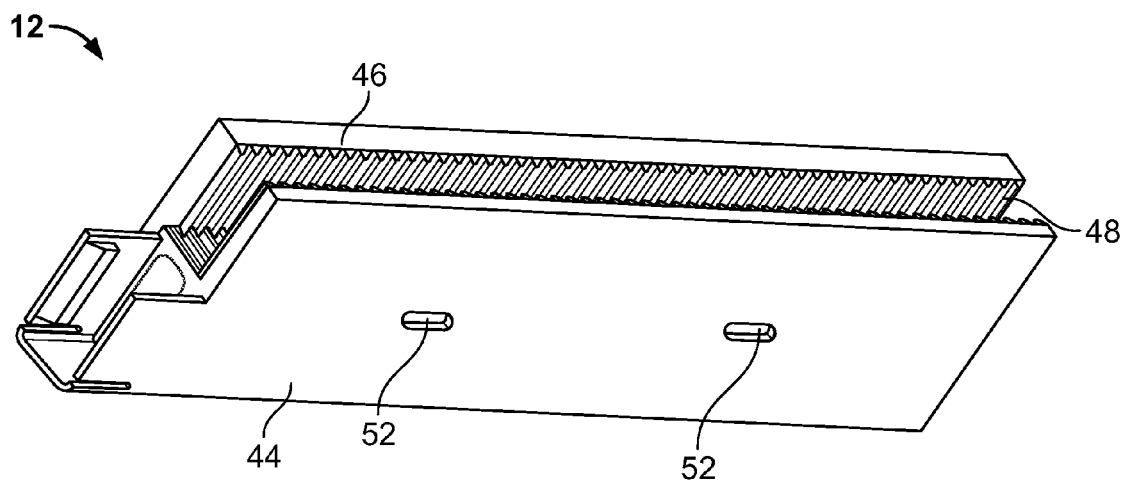
FIGS. 8-11 provide alternate views of the present invention.
Figure 9:
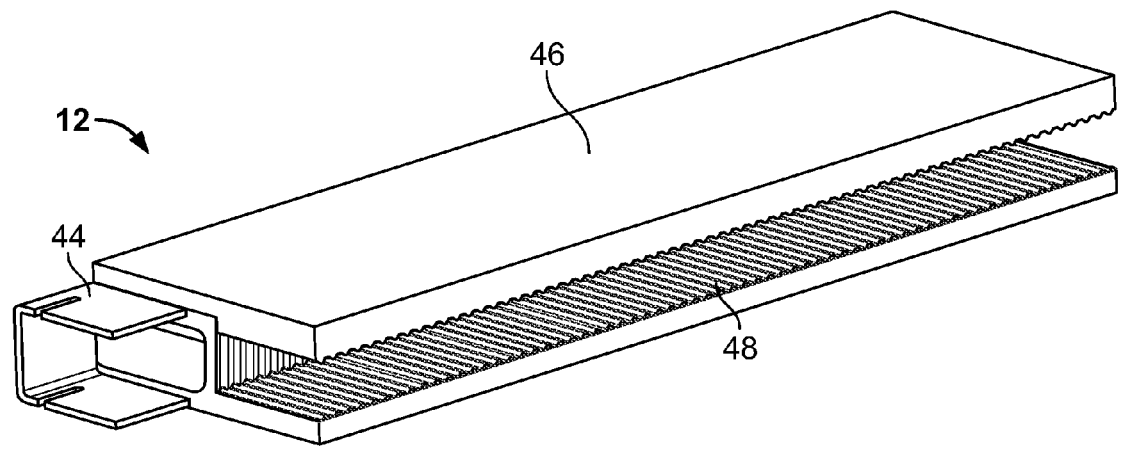
Figure 10:
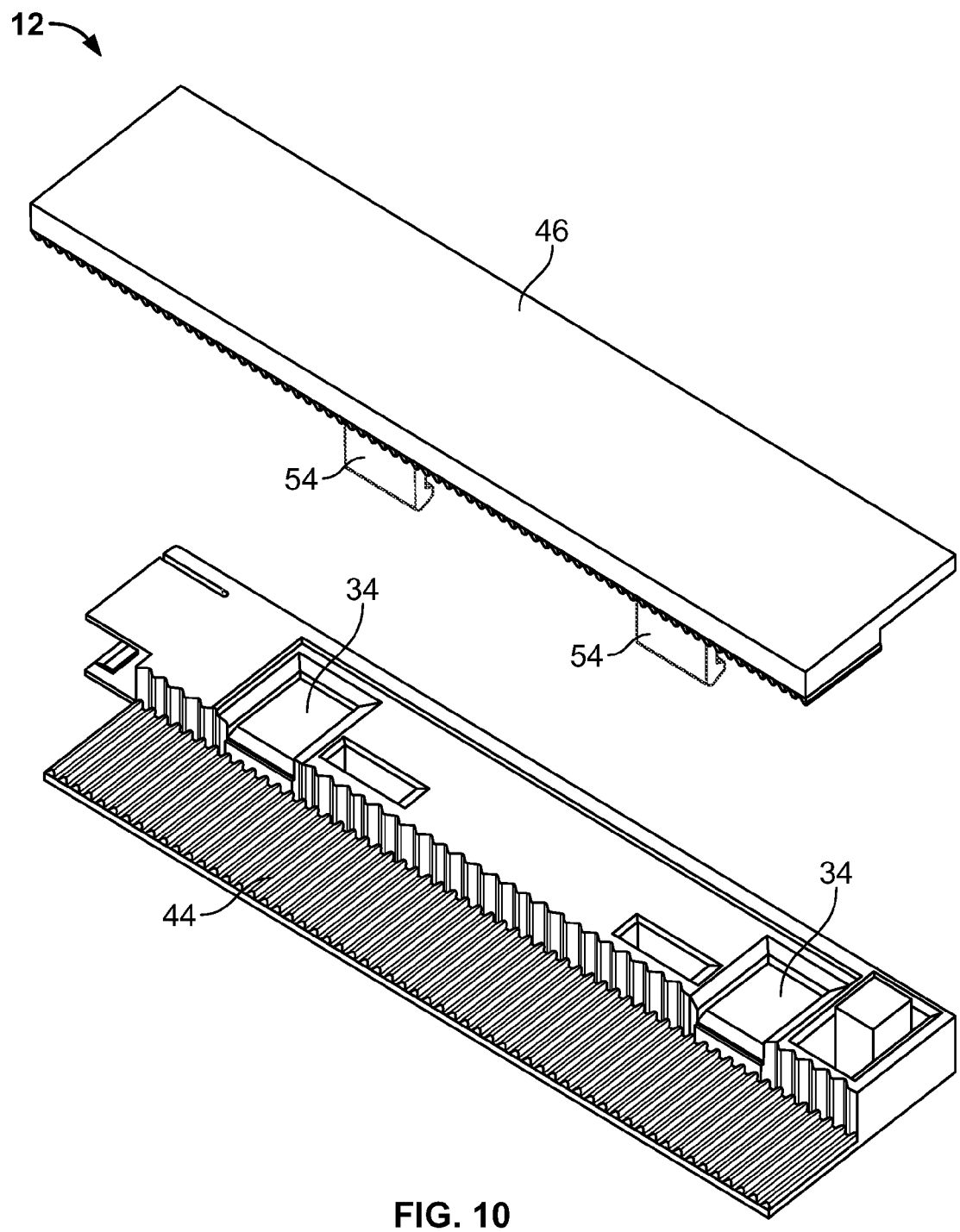
Figure 11:
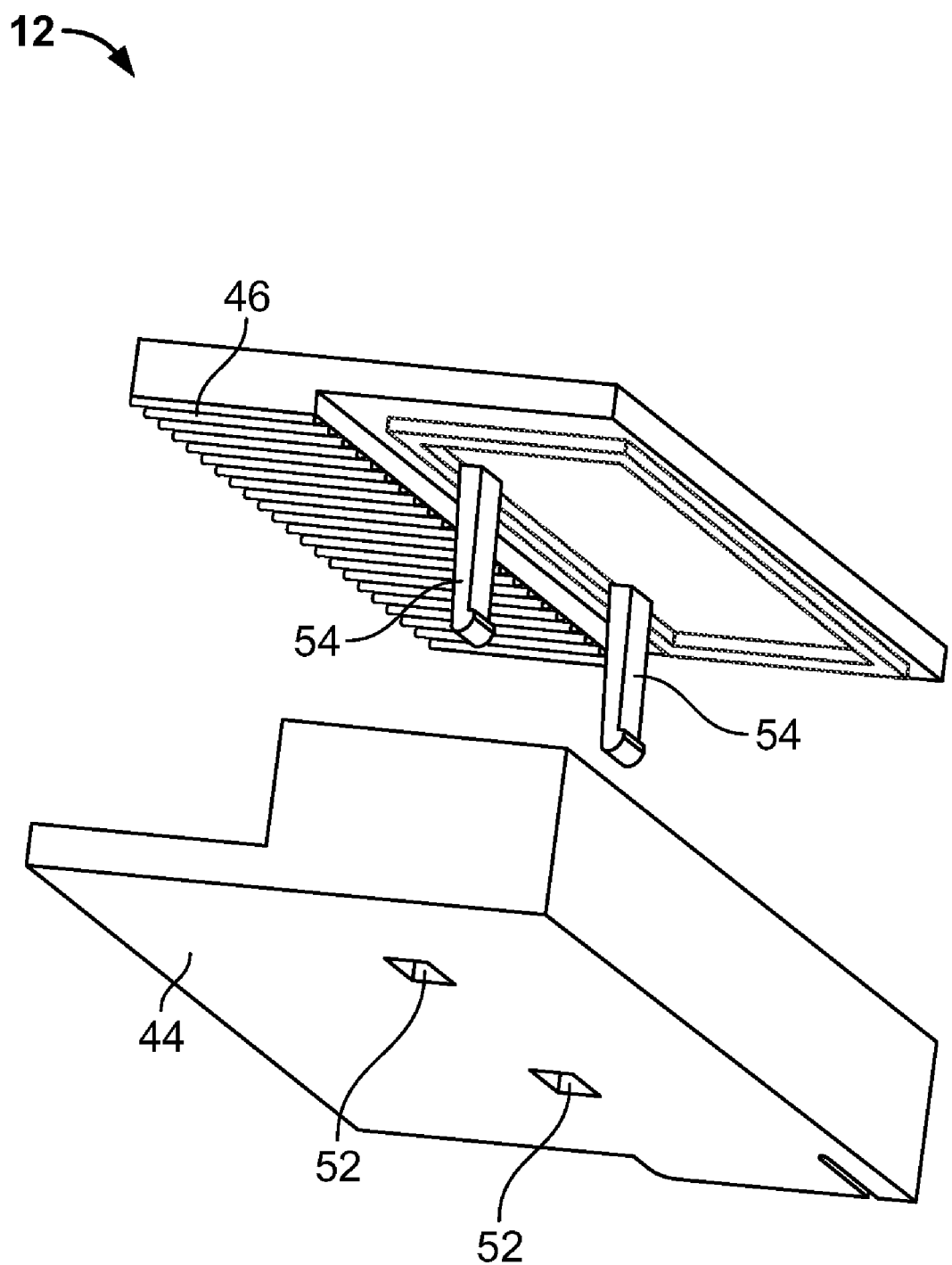

An embodiment, shown in FIGS. 6-11, of the output module (not shown) of the edge connector 10 includes a two-piece design, having a housing portion 44 and a cover portion 46. When placed on the housing portion 44, the cover portion 46 and housing portion 44 define a channel 48. The arrays 16, 18 fit into the channel 48 and a connection is made between the connector 10 and the array foils 14, 16. FIG. 7 illustrates the edge connector 10 with the cover portion removed. A groove 50 is molded in the housing 44 to help contain sealant and to align the cover portion 46 when in place. The housing portion 44 also has large latch receptacles 52 that accept the latches 54 on the cover portion 46 (FIGS. 8-11) when the cover portion 46 is in place.

FIGS. 8-11 illustrate various views of the two-piece edge connector. The inner surface of the channel 48 is ridged or ribbed to provide an enhanced surface for bonding onto the array. Once the connector 10 is placed onto the array 16, 18, an adhesive product, e.g. as RTV silicon, is applied to secure the connector 10 to the array with a waterproof bond. The cover portion 46 has latches 54 to hold the cover portion 46 on the housing portion 44 when in place. The exemplary embodiment has two latches 54, however, any number of latches may be used. The housing portion 44 has latch receptacles 52 that are designed to accept the latches 54 when in place. Once the cover portion 46 is placed on the housing portion 44, the latches 54 are engaged in the receptacles 52 and are not easily removable.

Figure 12:
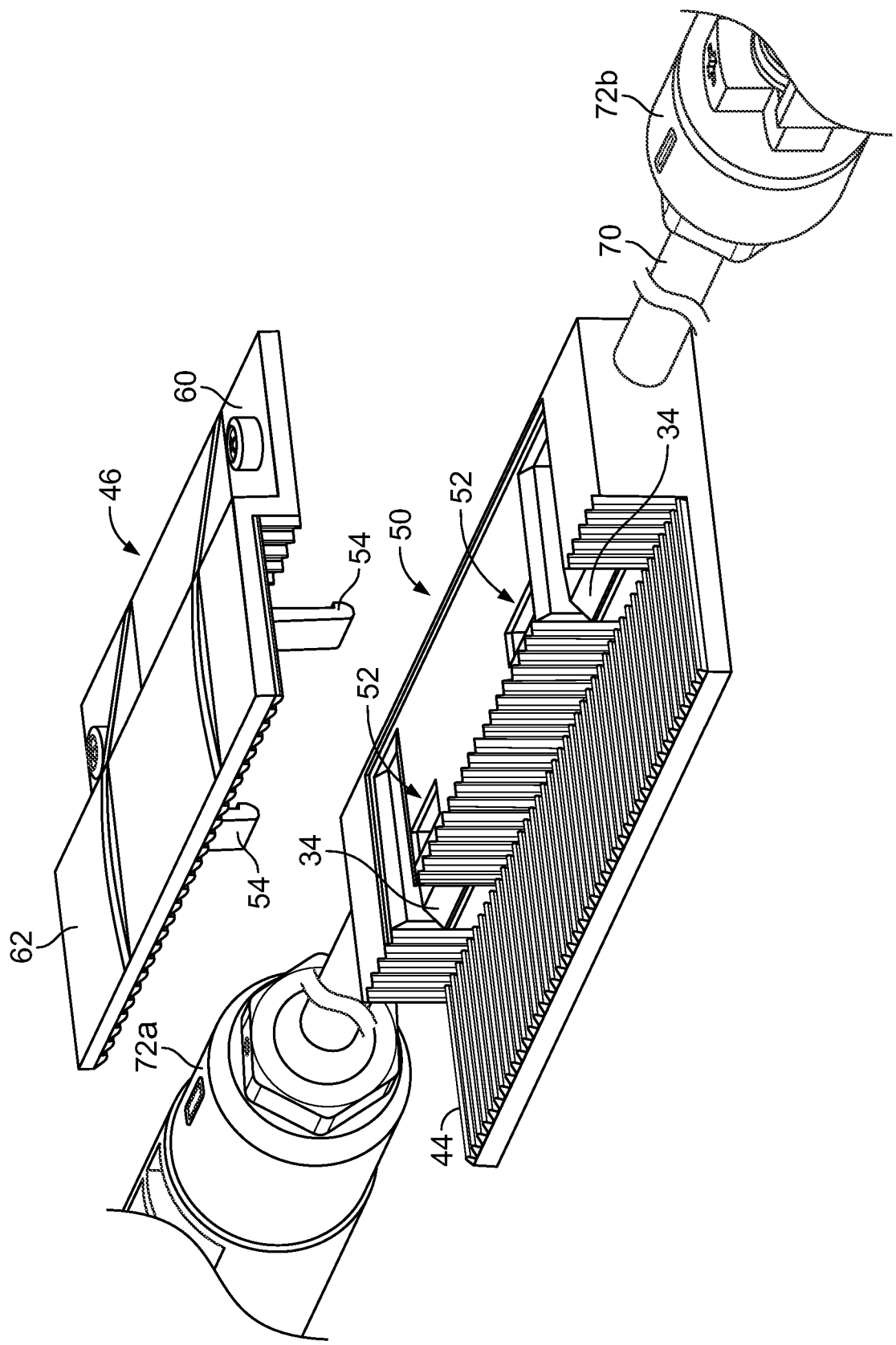
FIG. 12 is a perspective view of an embodiment of the present invention.

Yet another embodiment of the input module of the present invention includes a two-piece design where the cover portion 46 is designed to allow for a thicker array edge shown in FIG. 12. Arrays 16, 18 may have various thicknesses, depending on the application, thus the edge connectors 10 must be designed to accommodate a range of thicknesses e.g. ¼" to ¾". FIG. 12 illustrates a cover portion 46 that is two tiered. The first tier 60 rests on the housing portion 44 and the second tier 62 forms a portion of the channel 48 that fits around the array edge. The housing portion 44 has a groove 50 to contain sealant when applied to secure the connector 10 to the array and to secure the cover portion 46 to the housing portion 44.

Figure 13:
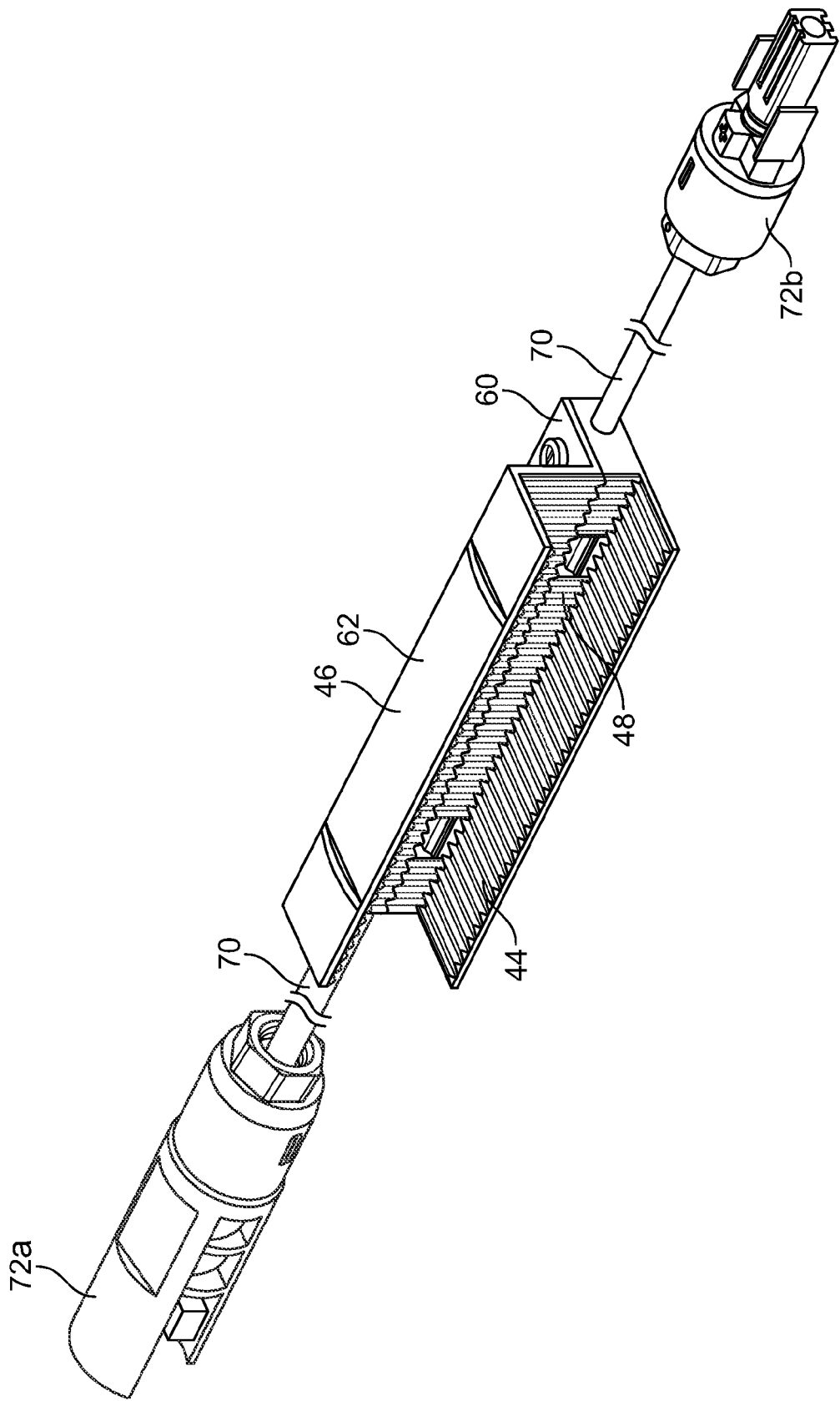
FIGS. 13-14 provide alternate view of the present invention.
Figure 14:
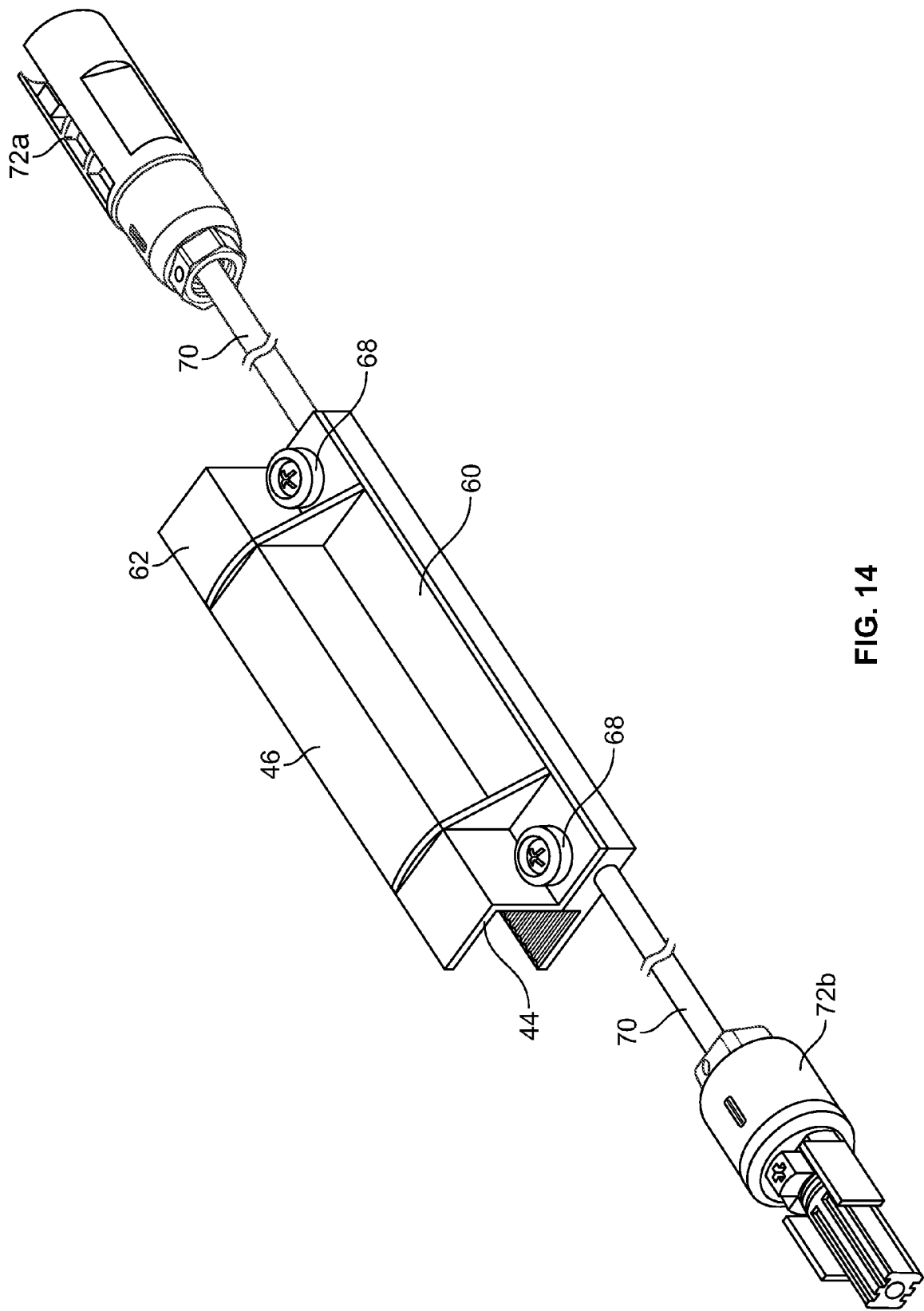
Figure 15:
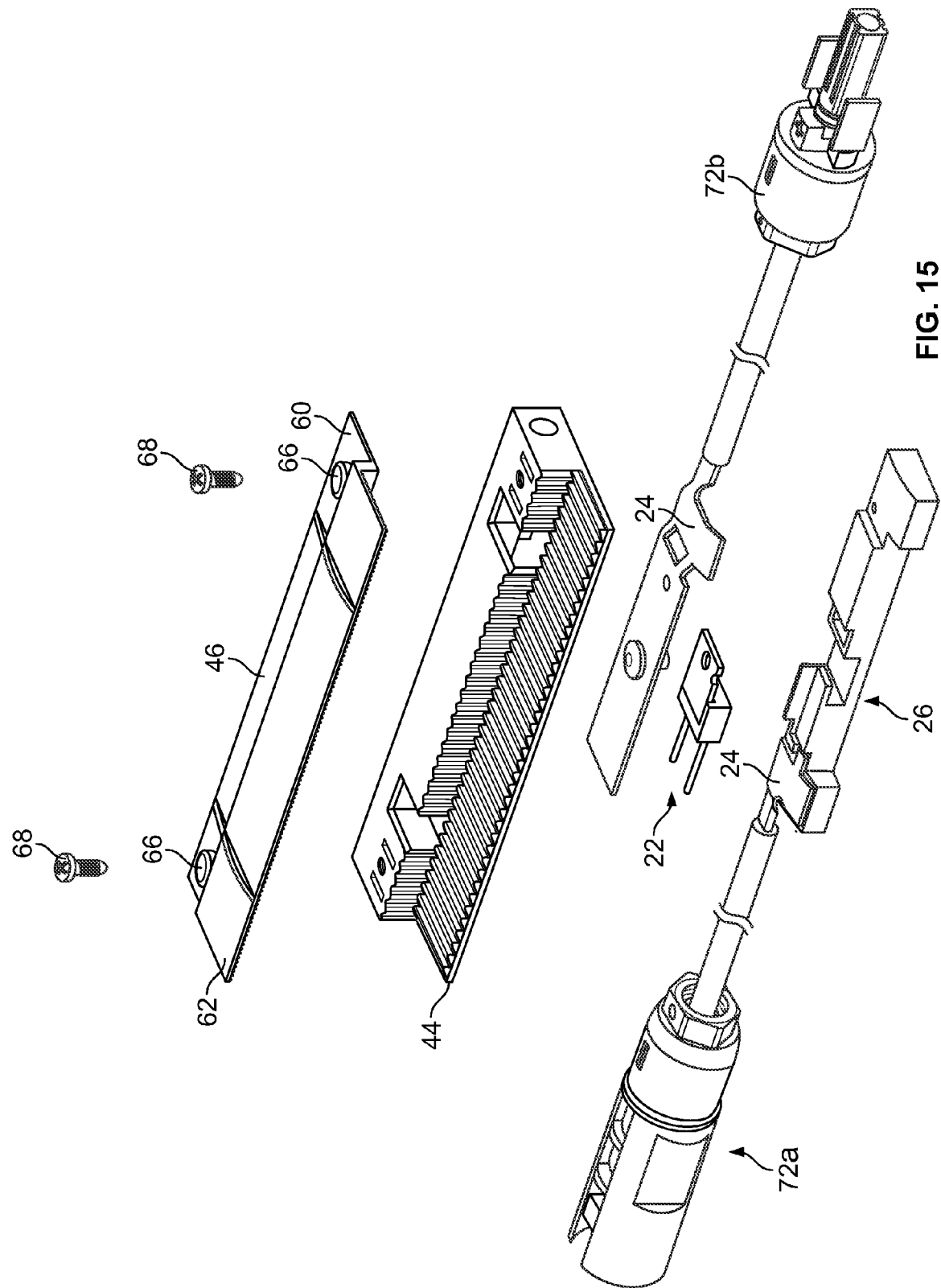
FIG. 15 is a perspective view of an embodiment of the present invention.

FIGS. 13-15 illustrate another embodiment of the present invention. The edge connector (not shown in FIGS. 13-15) is a two-piece design with a cover portion 46 and a housing portion 44 where the channel 48 is formed to fit onto an array 16, 18 having a greater thickness. The cover portion 46 has a two-tiered shape, with a first tier 60 and a second tier 62. The cover portion 46 has apertures 66 that accept fasteners 68, e.g. screws, and secure the cover portion 46 to the housing portion 44. The height of the channel 48 may vary, depending on the thickness of the array.

The cover portion 46 fits onto the top of the housing portion 44 and is secured with fasteners 68. A diode 22 is connected to the circuitry to ensure proper conduction of the energy, and a heat sink 24 is placed in contact with the diode 22 to act as a contact and heat dissipater. A component shuttle 26 is used to manage the components of the edge connector 10 during manufacture. The shuttle 26 holds the components in place. In addition to the shuttle 26, a rivet 28 is used to secure the heat sink 24 to the diode. An alternative to the rivet 28, a solder or weld connection may be used, such as an ultra sonic weld connection. A connector is used to mate with an adjacent edge connector (not shown) to transmit the energy from the array.

The edge connector 10 may be of an size or dimensions suitable for the array, however, the dimensions may be 4" in length, 1" inch deep, and ⅜" to ⅞" thick. Typically, the array is ¼" to 1" thick, therefore, the channel 48 on the connector 10 be at least wide enough to accommodate the array of this thickness to fit snugly into the channel 48.

Preferably, the connector operates with at least 15 amps of current, however the connector 10 accommodates a minimum of 0.5 amps to a maximum of 18 amps with the TO-220 diode.

The connector may also be connected in series to a maximum of thirty connectors, where the male connection 72a of one connector mates with the female connection 72b of the adjacent connector. The edge connector 10 may also include larger heat sinks, to allow for a larger current capacity. A larger heat sink provides greater heat dissipation, and requires a correspondingly larger connector 10 housing.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An electrical connector for interconnecting adjacent photovoltaic arrays along an edge, the connector comprising:
   an input module housing unit having at least one of:
      a diode to support a predetermined voltage and current;
      a heat sink in thermal communication with the diode and configured to dissipate heat;
      at least two connection points being electrically conductive;
      a channel configured to receive the edge of a first photovoltaic array;
      a base portion configured to hold the at least one diode, heat sink, connection point, and channel;
   an output module configured to connect with the input module having at least one of:
      at least two connection points being electrically conductive;
      a channel configured to receive the edge of a second photovoltaic array;
      a base portion configured to hold the at least connection point and channel;
   an electrically conductive cable configured to connect the input module and output module; and
   wherein the input module and the output module are secured to the edge of photovoltaic arrays and are in electrical communication with each other through the electrically conductive cable and wherein the connection point conducts photon energy from the array to the connector.

2. The connector of claim 1 wherein the diode is a TO-220 Schottky diode.

3. The connector of claim 2 wherein the heat sink is secured to the base portion with an ultra sonic weld connection, resistance weld connection or rivet.

4. The connector of claim 1 wherein the diode and the heat sink are a unitary device.

5. The connector of claim 2 wherein the input module and output module are secured to the photovoltaic arrays with a silicon epoxy.

6. The connector of claim 2 wherein the predetermined current is a minimum of 0.5 amps and the predetermined current is a maximum of 18 amps.

7. The connector of claim 1 further comprising a male connection and a female connection, wherein a plurality of connectors are connected in series and the male connection of a first connector mates with the female connection of an adjacent connector.

8. The connector of claim 7 wherein a maximum of thirty connectors are connected in series.

9. The connector of claim 1 further comprising an input module housing unit having three connection points and an output module having three connection points.

10. An electrical connector for interconnecting adjacent photovoltaic arrays along an edge, the connector comprising:
    an input module housing unit having at least one of:
       a diode to support a predetermined voltage and current;
       a heat sink in thermal communication with the diode and configured to dissipate heat;
       at least two connection points being electrically conductive;
       a channel configured to receive the edge of a first photovoltaic array;
       a cover portion;
       a base portion configured to hold the at least one cover portion, diode, heat sink, connection point, and channel;
       wherein the cover portion and the base portion are secured with a fastener;
    an output module configured to connect with the input module having at least one of:
       at least two connection points being electrically conductive;
       a channel configured to receive the edge of a second photovoltaic array;
       a base portion configured to hold the at least connection point and channel;
    an electrically conductive cable configured to connect the input module and output module; and
    wherein the input module and the output module are secured to the edge of photovoltaic arrays and are in electrical communication with each other through the electrically conductive cable and wherein the connection point conducts photon energy from the array to the connector.

11. The connector of claim 10 wherein the fastener is a latch or a screw.

12. The connector of claim 10 wherein the diode is a TO-220 Schottky diode.

13. The connector of claim 12 wherein the heat sink is secured to the base portion with a rivet of an ultra sonic weld connection.

14. The connector of claim 13 wherein the diode and the heat sink are a unitary piece.

15. The connector of claim 13 wherein the minimum predetermined current is 0.5 amps and the maximum predetermined current is 18 amps.

16. The connector of claim 10 further comprising a male connection and a female connection, wherein a plurality of connectors are connected in series and the male connection of a first connector mates with the female connection of an adjacent connector.

17. The connector of claim 13 wherein a maximum of 30 connectors are connected in series.

18. The connector of claim 13 wherein the input module and output module are secured to the photovoltaic arrays with a silicon epoxy.

19. The connector of claim 10 further comprising an input module housing unit having three connection points and an output module having three connection points.

20. An electrical connection system for interconnecting adjacent photovoltaic arrays along an edge, the connection system comprising:

a plurality of connectors, the maximum number of connectors in the plurality of connectors being thirty connectors, the plurality of connectors comprising:
as input module housing unit having at least one of:
  a diode to support a predetermined voltage and current;
  a heat sink in thermal communication with the diode and configured to dissipate heat;
  at least two connection points being electrically conductive;
  a channel configured to receive the edge of a first photovoltaic array;
  a base portion configured to hold the at least one cover portion, diode, heat sink, connection point, and channel;
an output module configured to connect with the plurality of input modules having at least one of:
  at least two connection points being electrically conductive;
  a channel configured to receive the edge of a second photovoltaic array;
  a base portion configured to hold the at least connection point and channel;
an electrically conductive cable configured to connect the input module and output module;
wherein the input module and the output module are secured to the edge of photovoltaic arrays and are in electrical communication with each other through the electrically conductive cable, wherein the connection point conducts photon energy from the array to the connector, and wherein a male connection from the output module of a first connector of the plurality of connectors mates with a female connection from the input module of an adjacent connector of the plurality of connectors.

* * * * *